(No Model.)
C. F. DE LA ROCHE.
VOLTAIC ARC ELECTRIC LAMP.
No. 264,257.  Patented Sept. 12, 1882.
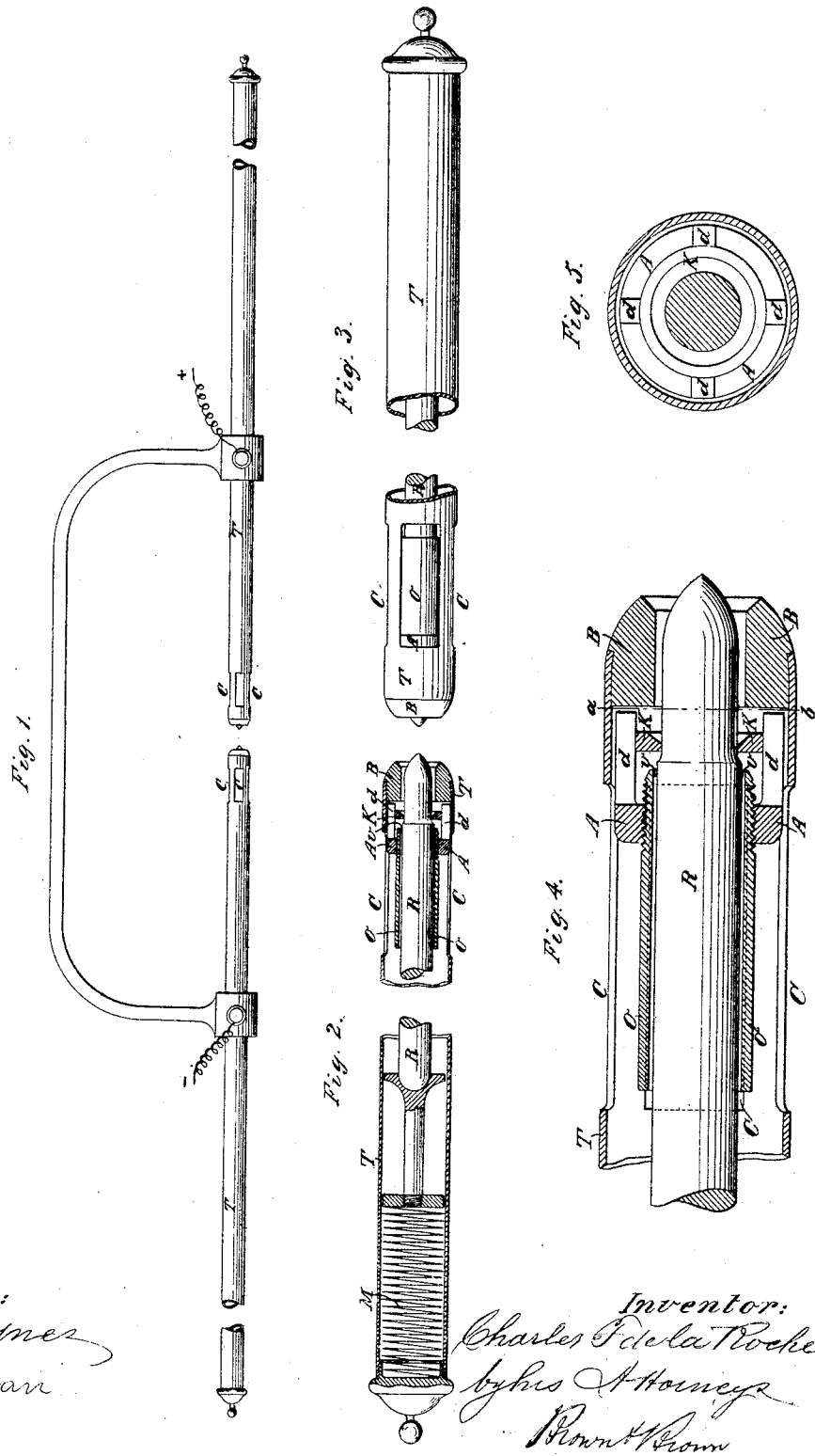
Witnesses:
Fred K. Haynes
Ed. L. Moran
Inventor:
Charles F. de la Roche
by his Attorneys
Brown & Brown

UNITED STATES PATENT OFFICE.

CHARLES FERDINAND DE LA ROCHE, OF PARIS, FRANCE.

VOLTAIC-ARC ELECTRIC LAMP.

SPECIFICATION forming part of Letters Patent No. 264,257, dated September 12, 1882.

Application filed July 7, 1882. (No model.)

*To all whom it may concern:*

Be it known that I, CHARLES FERDINAND DE LA ROCHE, of Paris, France, have invented a new and useful Improvement in Voltaic-Arc Electric Lamps, of which the following is a specification, reference being had to the accompanying drawings.

The object of my invention is to enable the feeding or advancement of the carbons to be effected by the direct action of a spring or counter-weight, which presses them against a stop without the aid of clock-work or other complicated mechanism.

The invention consists principally in the combination, with a guide-tube through which the electrode passes, of an abutment-ring which is attached to the said tube, and between which and the front end of said tube there is provided an open space, the portion of the electrode within the said tube being protected from the surrounding air, but the heated portion exposed in the open space between the said tube and the said ring being exposed to the air, so as to permit of its disintegration to the degree or extent desired to permit it to be fed forward to the abutment-ring.

The invention also consists in making the said ring adjustable relatively to the said tube for the purpose of varying the open space between them to regulate the feeding forward or advance of the electrodes.

The invention further consists in the method of attaching the abutment-ring to the said tube, whereby provision is afforded for the adjustment of the said ring to vary the open space between them and regulate the feeding of the electrode.

There have been previously used for the regulation of the advance or feed of the electrodes abutment rings or stops, against which the electrodes have been pressed by weights or springs; but such regulation has not been successful, sometimes owing to the voltaic arc consuming not only the part of the electrode protruding in advance of such ring, but also a sufficient length behind the said ring to produce frequent irregularities in the advancement of the electrode under the action of the spring or weight which presses it forward, and in other cases, owing to the electrode not being consumed fast enough, it has melted the ring, and so destroyed the regulation.

I have recognized that the combustion and using up of the electrodes stop where they cease to be exposed to the combined action of the heat disengaged by the arc and of the destructive action of the air. Thus, for example, if we take two electrodes, one free from any envelope or outer protection from air advancing toward the other, which is surrounded with a tube to or nearly to its extremity, the combustion of the latter will be considerably less than that of the former. I have also recognized that the consumption stops at the end of the tube in a well-defined line, and that the part surrounded by the tube is not impaired in hardness. The action of the air, then, plays an important part in the consumption of the electrodes. My system permits, then, the practical utilization of the abutment of the electrodes against a ring to regulate their advance by the action of a spring or other means of propulsion, and by it a saving of about fifty per cent. in the consumption of the carbon of the electrodes.

Figure 1 in the drawings is a side view of a lamp with my invention applied. Fig. 2 is a central longitudinal section of one of the electrode-holders and its feeding apparatus on a larger scale than Fig. 1. Fig. 3 is an outside longitudinal view corresponding with Fig. 2. Fig. 4 is a central longitudinal section of a portion of the holder on a still larger scale. Fig. 5 is a transverse section on the line *a b* of Fig. 4.

O is a tube, of copper, platinum, or other metal, of such size that the electrode may pass freely through it, and having screwed onto its front portion a collar, A, furnished with prongs $d\ d$, which receive between them and support and hold the abutment ring or washer K, the interior of which is of a diameter a little less than that of the electrodes employed, in order that the latter may be only allowed to be advanced or fed according to their consumption by the impulse of the spiral spring M, which is placed in the outer tube, T, which contains the electrode and its feeding and controlling apparatus. Between the extremity of the tube O and the ring K, I leave a space, *v*, the width of which may be regulated according to the diameter of the electrodes by screwing the collar A farther or not so far on the tube O. According as the portion of the electrode within the space $v$ is attacked by the heat, it is disintegrated, and the spiral spring M advances the electrode R in proportion to its consumption. Under these conditions the heat transforms my system into a pyrometric apparatus, of which the separation or space $v$ becomes either greater or less, according as the voltaic arc consumes the electrodes more or less rapidly and brings them more or less rapidly to the ring K; but in either case the electrode cannot advance at once a distance greater than the width of the space $v$ determined beforehand.

In order to prevent the heat and the oxidation from causing any change of thickness of the ring K and of the tube O, I prefer to construct of platinum both the ring K and also the extremity of the tube O, which limits the space $v$. Moreover, in order to protect this metallic part of my system, I fit the front end of the tube T with a ring, B, of magnesia or other refractory substance.

In order to permit the exterior arc to corrode the electrode in rear of the abutment-ring K, and to keep the protecting-tube O cool, I provide in the outer tube, T, openings C C, opposite to the said tube O. It is for the same purpose that the collar A is slotted, so that its front part consists only of three or four prongs, $d\ d$, which support the abutment-ring K, and I also make the ring B of magnesia, with a central opening of a diameter larger than the electrode, in order to provide free access between them to the surrounding air.

In the example of the lamp represented in the drawings the two electrodes are pressed forward by two spiral springs, M M, placed in the tubes T; but it may be understood that a single spring may be used applied directly to one electrode, the other electrode being put in movement by means of levers, racks, or pinions, which will be also operated by the same spring.

This invention may be applied to all kinds of voltaic-arc electric lamps, whether the electrodes be horizontal, vertical, or inclined, oblique, or parallel.

What I claim as my invention, and desire to secure by Letters Patent, is—

1. The combination, in an electric lamp, of a guide-tube for the electrode and an abutment-ring attached to the said tube, and between which and the end of the said ring there is a determined open space provided, substantially as and for the purpose herein described.

2. The combination of the guide-tube O and the adjustably-attached abutment-ring K, having a variable space, $v$, between them, substantially as and for the purpose herein described.

3. The combination of the guide-tube O, the adjustable collar A, screwing upon said tube, and provided with prongs $d\ d$, and the abutment-ring K, held between said prongs, substantially as herein described.

CHARLES FERDINAND DE LA ROCHE.

Witnesses:
  EUG. DUBUIL,
  LÉON PECQUET.